Nov. 14, 1961  L. W. COFFIN  3,008,722
ATTACHMENT FOR FARM MACHINES FOR HANDLING MATERIALS
Filed Nov. 3, 1959  6 Sheets-Sheet 1

INVENTOR
Lester W. Coffin
BY
ATTORNEY

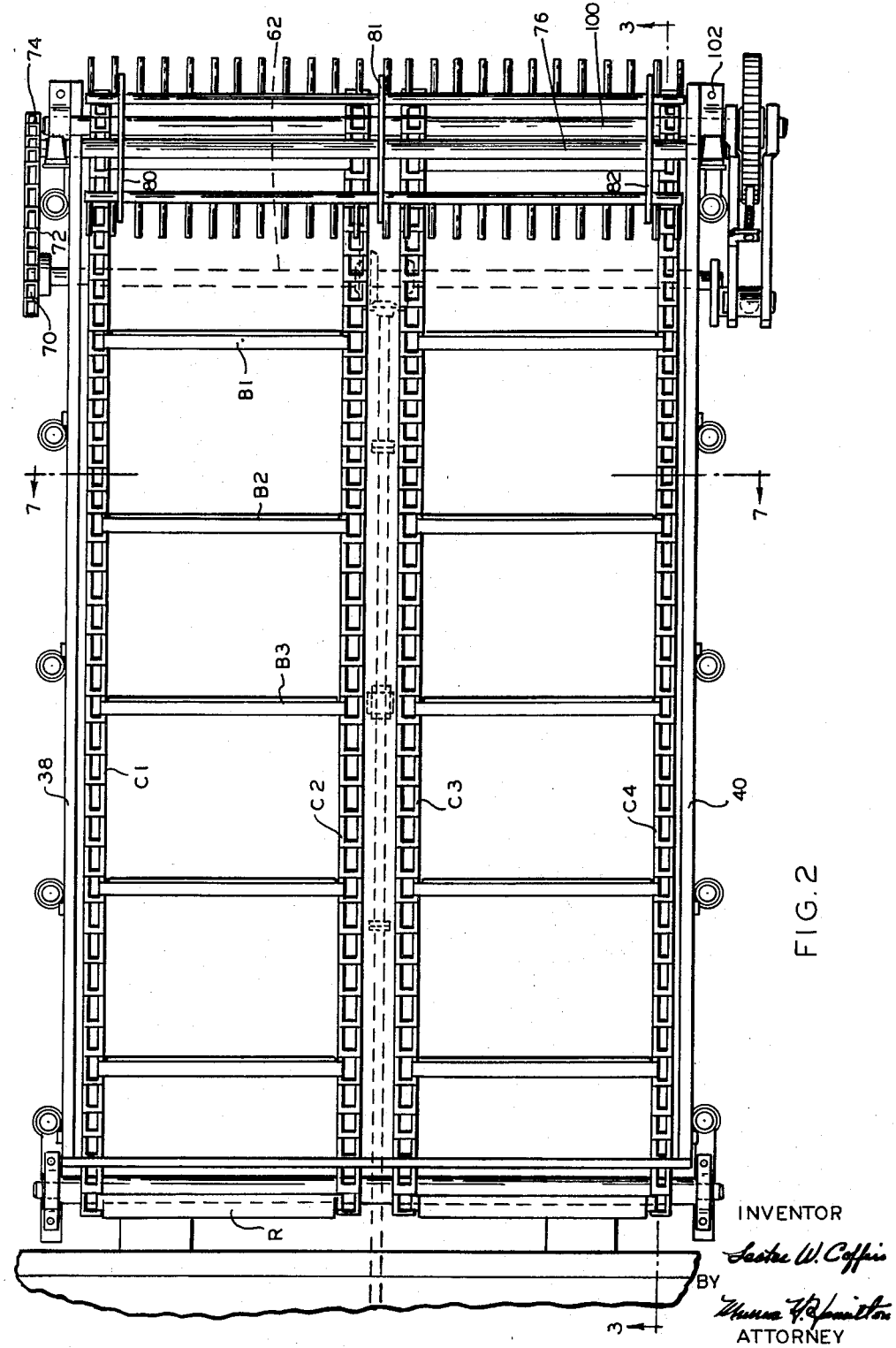

Nov. 14, 1961 L. W. COFFIN 3,008,722
ATTACHMENT FOR FARM MACHINES FOR HANDLING MATERIALS
Filed Nov. 3, 1959 6 Sheets-Sheet 3
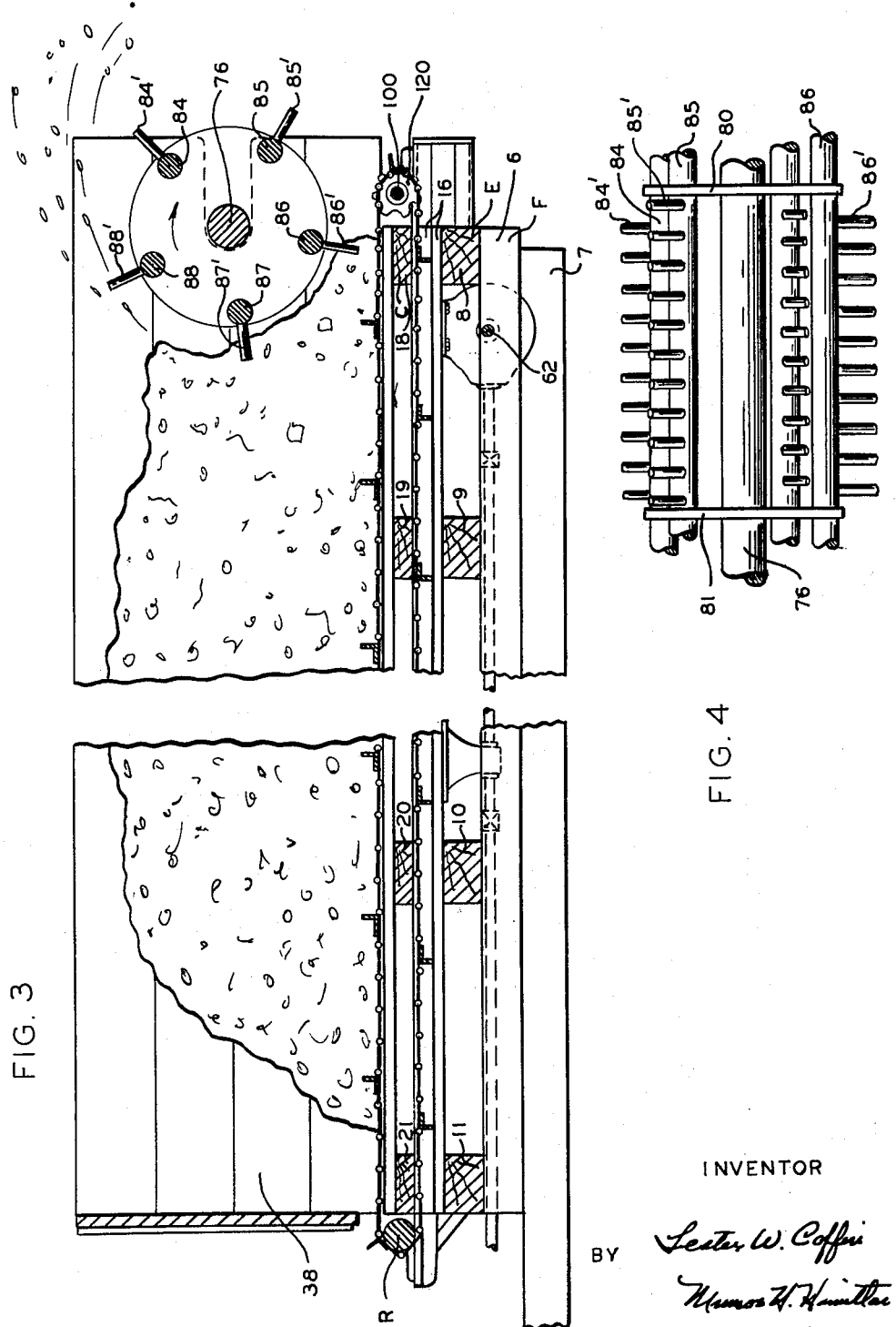
INVENTOR
Lester W. Coffin
BY
ATTORNEY Nov. 14, 1961  L. W. COFFIN  3,008,722
ATTACHMENT FOR FARM MACHINES FOR HANDLING MATERIALS
Filed Nov. 3, 1959  6 Sheets-Sheet 4

INVENTOR
Lester W. Coffin
BY
Hubert T. Hamilton
ATTORNEY

Nov. 14, 1961    L. W. COFFIN    3,008,722
ATTACHMENT FOR FARM MACHINES FOR HANDLING MATERIALS
Filed Nov. 3, 1959    6 Sheets-Sheet 6

INVENTOR
Lester W. Coffin
BY
Munro T. Hamilton
ATTORNEY

United States Patent Office 3,008,722
Patented Nov. 14, 1961

3,008,722
ATTACHMENT FOR FARM MACHINES FOR
HANDLING MATERIALS
Lester W. Coffin, Star Rte., Rumney, N.H., assignor of one-half to Paul Bosworth, Plymouth, N.H.
Filed Nov. 3, 1959, Ser. No. 850,710
8 Claims. (Cl. 275—6)

This invention relates to farm machinery, and more particularly to apparatus for pulverizing, spreading, and unloading manure, sand and similar materials commonly employed in farming operations.

It is an object of the invention to devise a combination manure spreader and truck body construction by means of which a truck chassis may be provided with a satisfactory type of truck body for containing and hauling materials and yet this truck body may be quickly converted to a manure spreader by locating through the truck body a specially constructed spreader mechanism of novel character.

Another object of the invention is to provide a protectively and positively contained drive for actuating beater and conveyor mechanisms wherein the drive may be operatively connected to a standard power take-off in such a way that a more positive transmission of power may be realized in a range of difficult working positions of a truck body and a substantially greater degree of durability is realized particularly in relation to sprocket driving chain life.

Still another important object is to provide a mechanism which may be operated independently of the beater and spreader components so that a controlled unloading of materials such as sand, sawdust, corn, silage and the like may be carried out with the unloading being interrupted at will.

Still another object of the invention is to provide a novel beater bar mechanism and method of beating by means of which the degree of subdivision of particles of manure and other materials may be controlled and the area over which material is dispensed both rearwardly and laterally may be appreciably extended in comparison with standard form of spreaders.

Still another object of the invention is to devise an improved power transmission shaft assembly which transmits power from a power take-off unit through an extended shaft member running all the way back to the transverse driving axes of the beater and conveyor drives with the result that a much more rugged construction is realized with consequent longer life. In addition, elimination of lost motion is realized while a range of higher beater bar speeds become practical.

These and other objects and novel features may be more fully understood and appreciated from the following description of a preferred embodiment of the invention selected for purposes of illustration and shown in the accompanying drawings in which:

FIG. 2 is a fragmentary plan view of the structure shown in FIG. 1;

FIG. 3 is a cross sectional view taken on the line 3—3 of FIG. 2 and further indicating diagrammatically an actual spreading operation.

FIG. 4 is a detail fragmentary view of a special beater bar assembly of the invention;

Figure 8:
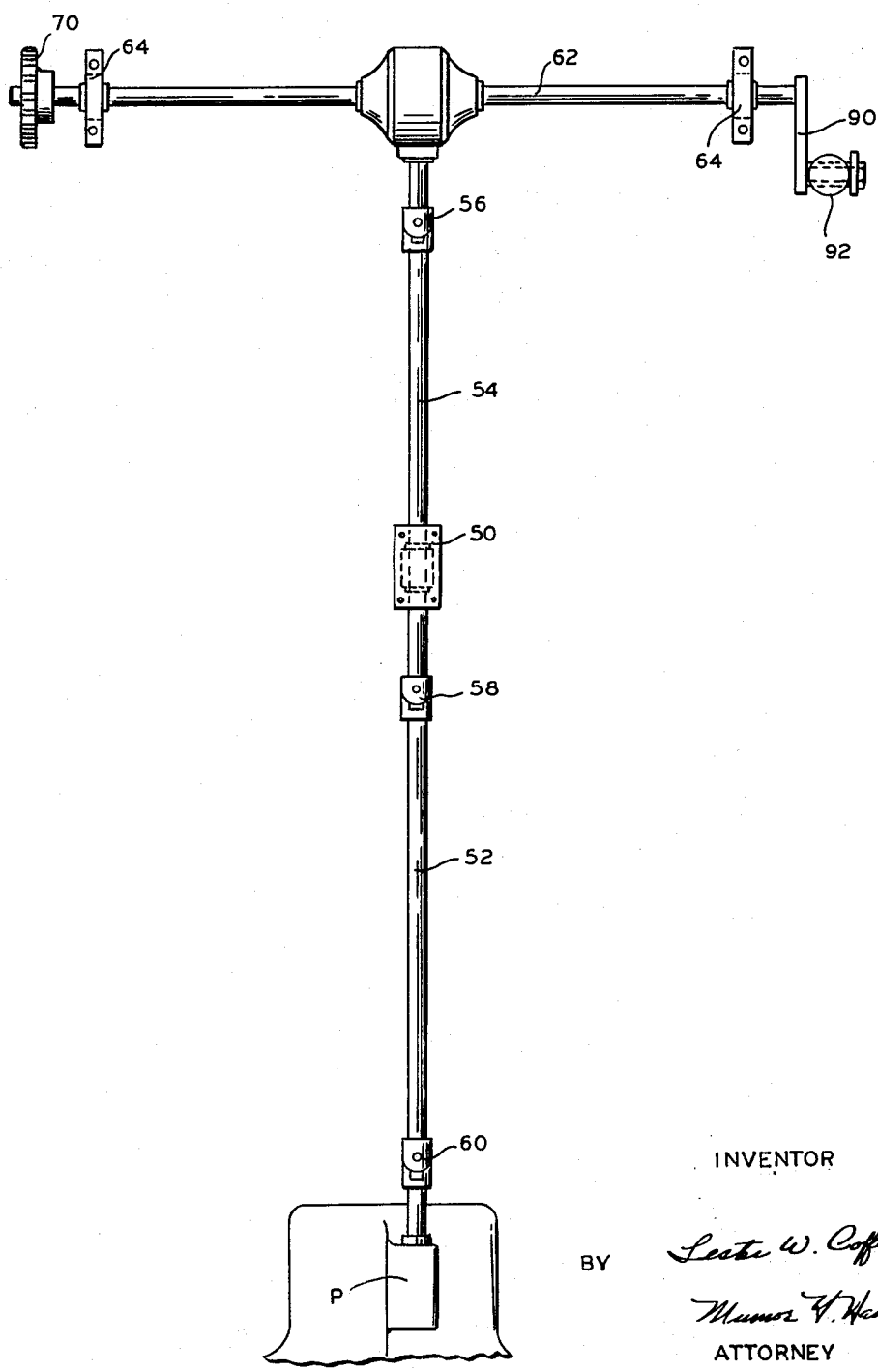
FIG. 8 is a plan view of the power transmission apparatus of the invention being taken approximately on the line 8—8 of FIG. 1.

In the strucure shown in the drawings, numeral 2 denotes a motor driven vehicle of some desired type such as a truck, tractor or the like, which may be employed to furnish motive power in connection with various farming operations or related activities. It is intended that in a preferred embodiment of the present invention, power driving means will be furnished from a conventional form of truck having a standard power take-off and such a power take-off is indicated in FIG. 8 of the drawings, and denoted by the letter P.

In accordance with the invention, I provide a combination spreader mechanism and materials handling body from which manure or other materials may be unloaded in connection with carrying out well known farm cultivating operations. The manure spreader mechanism of the invention, unlike conventional manure spreaders is mechanically organized to function with a special type of materials handling body construction. This special type of body construction which I have devised may be constructed to constitute either a mobile body such as a trailer which can be detachably secured to a motor driven vehicle, or the novel body construction of the invention may be incorporated as a material part of a truck body. The latter type of permanent installation constitutes a preferred form of the invention as shown in the drawings and the arrangement of parts is such that when desired the spreader mechanism may be readily removed to convert the body structure into a standard type of truck body.

The principal parts of the invention include the special materials handling body noted; a rotary beater mechanism mounted in the rear of the body; and a multiple conveyor chain and bar arrangement which moves around the bottom of the materials handling body in a protectively guided manner.

Figures 1, 11:
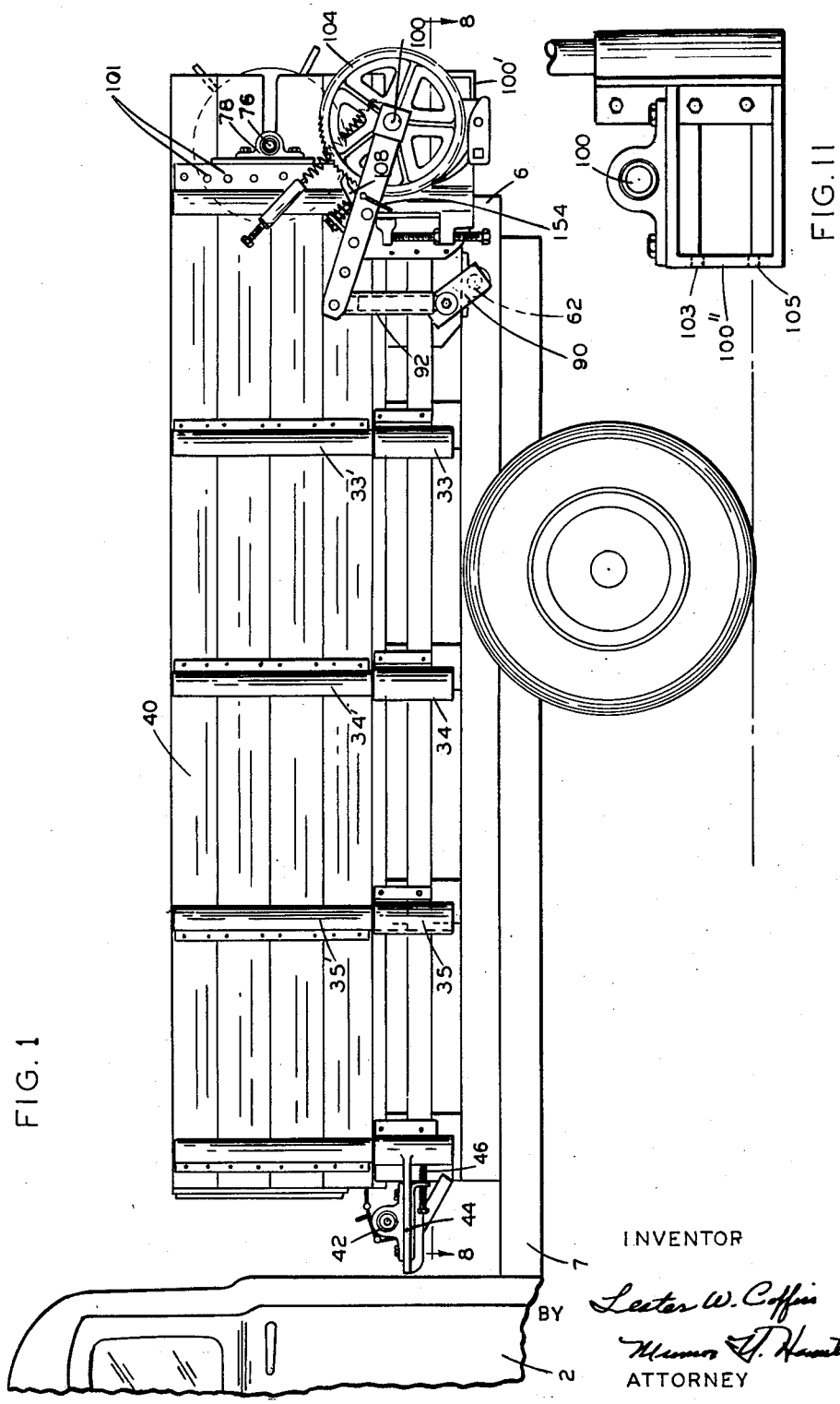
FIG. 1 is a fragmentary side elevational view of my combination truck body and manure spreader mechanism.
FIG. 11 is a detail view of a portion of the bracket structure which receives the bearing mounts for a ratchet supporting shaft.
Figure 5:
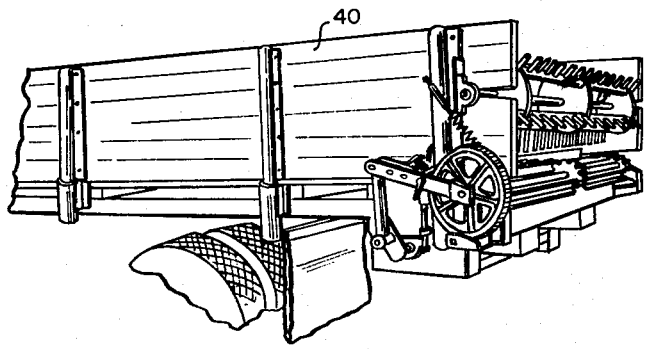
FIG. 5 is a fragmentary perspective view further illustrating a rear position of the spreader body and mechanism.
Figure 7:
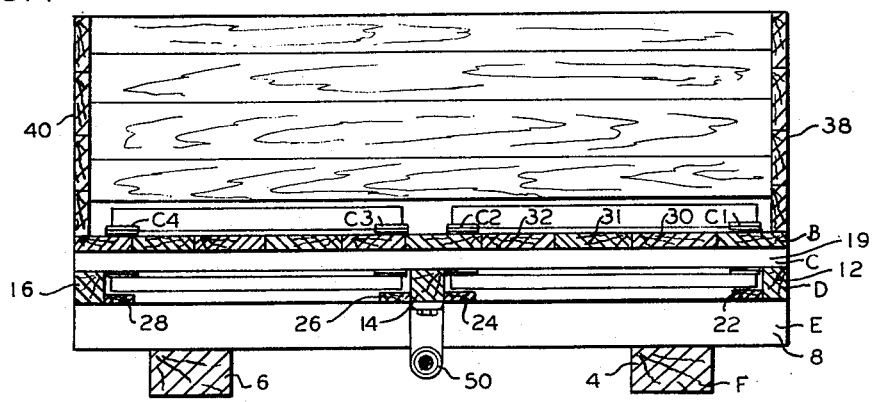
FIG. 7 is a vertical cross section taken on the line 7—7 of FIG. 2.

Considering in further detail this preferred truck body type of installation shown in the drawings, attention is directed to FIGS. 1, 3 and 7. Numerals 4 and 6 refer to supporting sills of wood or other materials which may, for example, be bolted to truck frame portions as 7 or fastened in any other desired manner. On these sills 4 and 6 are arranged cross pieces as 8, 9, 10, 11 which in turn support beams as 12, 14 and 16 and transverse frame pieces as 18, 19, 20 and 21.

Also secured across the members 8, 9, 10 and 11, in abutting relationship to the members 12, 14 and 16, are chain guiding strips as 22, 24, 26 and 28. Secured to the frame pieces 18, 19, 20 and 21 are longitudinal floor planks as 30, 31, 32, etc. which comprise the bottom surface of the truck body. Along either side of the structure described are provided stake sockets as 33, 34, 35, etc. in which are slidably received stakes as 33', 34', 35' which carry truck sides as 38 and 40.

Figure 6:
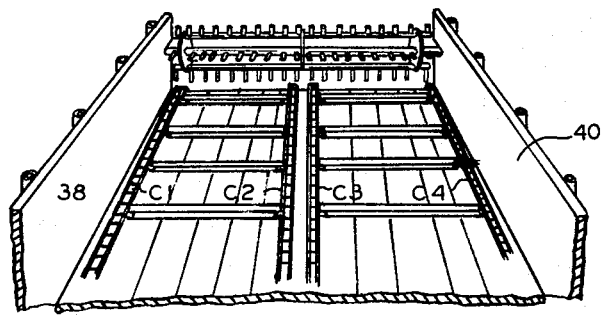
FIG. 6 is a perspective view looking inwardly of the truck body and illustrating the conveyor mechanism in relation to the beater bar assembly.

An important feature of the arrangement of structure elements described is the use of this structure for supporting sets of conveyor chains in a novel manner. As noted in FIGS. 2, 6 and 7, I provide four sets of endless chains which are generally indicated by the reference characters C1, C2, C3 and C4 and which are driven by sprocket gears as 120 hereinafter described. These chains are made up of a series of detachable links of well known type so that each of the chain links may be disengaged at any desired point in order to facilitate installation or removal from the truck body. The chains are attached to conveyor bars as B1, B2 and B3, etc. of conventional angle iron form and these bars are adapted to slide along the bottom of the truck body.

In accordance with the invention, I locate the chains in the channel spaces which are defined by the guide strips 22, 24, 26 and 28, so that the chains are continuously guided as they move along the underside of the truck bottom. At the same time, the chains are caused to pass over a special guide roll R, best shown in FIGS. 2 and 3 at the front of the truck body. The latter member is rotatably mounted in bearings 42 located in adjustable bearing supports 44. These bearing supports, as shown in FIG. 1, may be advanced or retracted by the adjustment screws 46 to control the tension in the chains.

The roll R is specially formed with smooth chain carrying surfaces which are limited by the space between the longitudinal frame pieces. These surfaces operate to hold the chain in a carefully limited path of travel, but there is a space for the chains to move sideways a short distance. As a result I have found that in use chain breakage is almost completely avoided. Breaking of chains frequently occurs with conventional sprocket gears because of the tendency of truck bodies to warp and twist when one of the wheels suddenly drops into a hollow or other depression in the course of an unloading operation. In the roll supported chain arrangement of the invention, however, the chains have an opportunity to become displaced laterally on the roll for a short distance and as a result sudden racking and consequent breaking of chains is avoided. Moreover, when the chains are disconnected they may be readily slid over the roll for ease of removal or installation.

The body construction described also serves a second useful function in supporting at the underside thereof a power transmission unit of novel character to take the place of power transmission systems heretofore employed in driving manure spreader mechanisms. It should be observed that in conventional arrangements it is customary to utilize sprocket gears and elongated sprocket chains which extend externally along one side of the truck body.

In my present invention I combine, with the body construction described, a rigidly supported power transmission arranged as illustrated in FIG. 8. In this arrangement a driving shaft is mounted in a central bearing 50 suspended from the underside of the body as shown in FIG. 7. The shaft includes sections 52 and 54 which are connected in a rearwardly inclined position below the truck body by means of universal joints as 56, 58 and 60. This driving shaft extends centrally along the truck body to a point closely adjacent to its rear end, and is connected by suitable gearing to a transversely disposed shaft 62 supported in two bearing members 64 and 66 as shown in FIG. 8.

Rotary driving force of the power take-off is transmitted through the shafts 54 and 62 to furnish motive power for both the chain drive, above described, and also the rotary beater bar assembly.

I find that by thus employing a relatively rigidly supported driving member which extends all the way between the power take-off, and the points of application of power for the driven shafts of the beater mechanism and the conveyor chain, I am enabled to avoid breakage of chain components and prevent lost motion with the result that a much more efficient driving operation can be realized. Moreover, I find that a further highly important advantage is realized in that materially greater rotative speeds may be resorted to in driving the rotary beater mechanism while at the same time maintaining a suitably controlled intermittent travel for the conveyor chains.

I have further discovered that in thus driving the rotary beater mechanism at materially increased rotative speeds, I am enabled to regulate the speed of the beater in relation to the speed of the conveyor to control the degree of subdivision which is accomplished in pulverizing the manure or other material discharged from the spreader apparatus. In this connection I have learned that a highly desirable factor from the standpoint of the farmer is application of manure in the form of a thin covering or dressing of very finely divided manure particles in order to obtain a more intimate mixture of fertilizer with the soil particles. Heretofore the spreading of manure and other fertilizers has been controlled with emphasis on the rate of discharge of material per unit of time.

I now find that another important consideration is regulation of the beater speed in relation to the conveyor speed. Specifically I have determined that for any given rate of feed of material along a truck body there is an upper range of operating speeds for a beater bar assembly which will greatly extend the degree of subdivision of the material. As illustrative of a range of beater speeds at which materially increased subdivision is realized when the conveyor operates at conventional speeds, there may be cited speeds of from 300 r.p.m. up to 550 r.p.m. Such speeds, I find, are capable of producing material of a particle size comparable to sand, whereas conventional beater speeds of from 50–100 r.p.m. will produce separated particles of material several times as large as this.

In driving the beater mechanism at the higher speeds noted, I provide at one end of the shaft 62 a sprocket gear 70 (FIG. 8) which meshes with a sprocket chain 72 (FIG. 2), and which is in turn engaged around a second sprocket gear 74. The latter gear is fast on a shaft 76 which is removably supported in slots in the truck body as illustrated in FIG. 2. The ends of the shaft are journaled in bearings detachably secured to the truck body as shown. Slidably secured to shaft 76 are spaced retainer plates 80, 81 and 82 through which are located circumferentially spaced rods as 84, 85, 86, 87 and 88. These rods are formed with radially extending holes in which are mounted sets of beater elements as 84', 85', 86', 87', 88' as best shown in FIG. 3. These beater elements are of a cylindrical cross section and occur in staggered relation to one another, as shown in FIG. 4.

An important new function of the beater elements 84', 85', 86', 87', 88' when driven at the higher relative speeds noted above is to discharge the finely divided material rearwardly and upwardly in an improved manner such that the ejected material falls along an area extending well beyond the sides of the truck for a distance of from 2 to 3 feet on each side. In conventional machines no coverage is realized at these areas. This increased coverage is, I find, due in part to high beater speed and in part to the cylindrical cross sectional shape of the beater elements whose convex surfaces occurring in staggered relation to one another tend to progressively displace particles laterally to the extent indicated.

Figure 9:
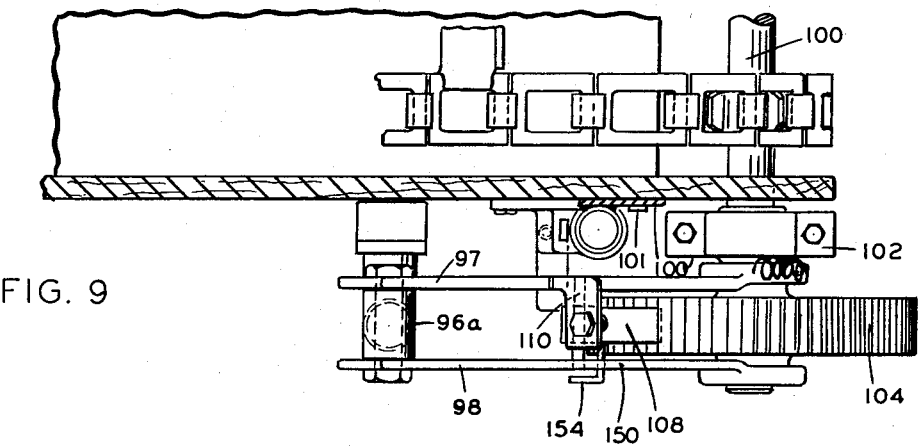
FIG. 9 is a detail plan view of the ratchet control mechanism for step feeding endless conveyor chains and conveyor bars along the bottom of the truck body.
Figure 10:
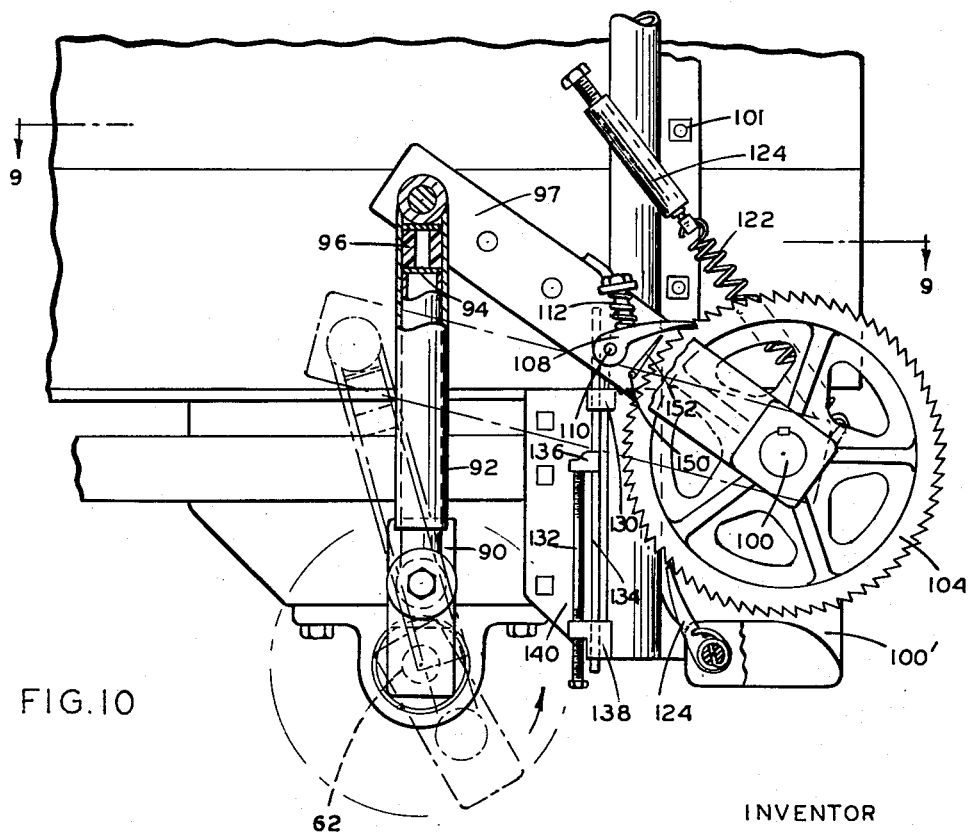
FIG. 10 is another detail elevational view further illustrating successive operative positions of the ratchet control mechanism shown in FIG. 9.

In order to utilize relatively high beater speeds of the magnitude indicated, and at the same time provide for regulating an intermittent drive for the chain conveyor for the same source of motive power, I have further devised a special ratchet control arrangement which is illustrated in FIGS. 1 and 2 and also in more detail in FIGS. 9 and 10.

The ratchet control arrangement includes a crank member 90 fixed at an opposite end of shaft 62 as shown in FIG. 8. Pivotally attached to the crank member 90 is a piston 94 movable in cylinder 92 towards and away from a resilient cushioning element 96. The element 96 consists of an annular rubber shock arrestor which is adapted to cushion impact of the cylinder against the piston in a desirable manner. The upper extremity of cylinder 92 is pivotally secured to a sleeve 96a supported between rocker arms 97 and 98 as shown in FIG. 9. The arms 97 and 98 have their respective opposite ends rotatably mounted on a ratchet wheel shaft 100 which, as shown in FIG. 2, extends between opposite sides of the truck body and is mounted in suitable bearings as 102.

The bearings 102 may be supported in some convenient manner as by bearing mounts 100' and 100", which include vertical extensions bolted to the truck body by bolts as 101. These bearing mounts 100' and 100" may also be formed with pin apertures as 103 and 105 in which can be received an auxiliary beater mechanism of well known type and not shown in the drawings.

Fixed to the shaft 100, at a point between the rocker arms 97 and 98, is a ratchet wheel 104. (FIGS. 9 and 10). The ratchet wheel teeth are slidably engaged with a pawl 108 pivotally mounted in the rocker arm 97 at point 110 and resiliently maintained against the ratchet wheel teeth by a spring 112.

It will be seen that rotative movement of shaft 62 will turn the crank 90 in a clockwise direction as viewed in FIG. 10. As the crank 90 moves from the broken line position of FIG. 10, to the full line position indicated, it causes the cylinder 92 to move upwardly and pivot the rocker arms in a clockwise direction against the resistance of a spring 122 adjustably anchored at 124. The arms through pawl 108 rotate the ratchet wheel which turns shaft 100 through a short arc of rotation and by means of sprocket gears as 120, on shaft 100, steps the conveyor chains ahead a predetermined distance with each revolution of shaft 62.

As the crank member 90 continues to rotate and drops back the rocker arms are resiliently drawn back by spring 122 with the pawl 108 sliding back over the ratchet wheel teeth. If desired, I may want to employ a pivoted stop 124 arranged to engage the ratchet wheel teeth at a lower side thereof and hold it against any counter clockwise rotation.

It will be observed that the ratchet control arrangement described is capable of providing a stroke of varying lengths depending upon the position of the piston 94 in cylinder 96. To regulate the length of stroke employed, I further provide a stop 130 which can be positioned in a desired position by an adjustment screw 132 which is in threaded engagement with a post 134 slidably disposed in guides 136 and 138 forming a part of a bracket 140 bolted to a side of the truck body. It will be seen that by this adjustment the speed of the conveyor may be regulated as desired, while relatively high rotative speeds may be induced in the beater bar through a common driving shaft.

Another important feature of the ratchet control described, is a release device for disengaging the pawl 108 from the ratchet wheel 104 and thus interrupting operation of the conveyor mechanism even though the power-take-off and the drive shaft are still actuated. This release mechanism includes a small shaft 150 which is pivotally mounted through the rocker arm 98 as shown in FIG. 9. On this small shaft 150 is fixed a lever element 152 (FIG. 10) which is arranged to move against the pawl 108 and lift it out of contact with wheel 104. To operate the lever element 152, I further provide a handle 154 which may be manually swung into a disengaging position when desired.

It will be observed that the release device is extremely useful in various connections. For example, if the conveyor mechanism is being used in a type of operation where the beater mechanism has been removed from the truck body and a simple unloading of sand or the like is being carried out, there may occur frequent situations where the operator wants to either start or stop the unloading at will.

Also in connection with an unloading operation my improved driving mechanism and the variable pawl actuating means makes it possible for me to greatly increase the speed of unloading as compared with any standard type of mechanism for this purpose.

It is also pointed out that this release means for instantly disengaging the conveyor is not present in conventional forms of spreaders and provides a further desirable control when operating the spreader mechanism.

From the foregoing description it will be apparent that I have disclosed a combination spreader mechanism and body construction which includes a number of desirable new features relating to operative performance and durability. This combination feature is further associated with a novel drive arrangement, as well as an improved method of comminuting farm materials in the course of a spreading operation.

While I have described a preferred embodiment of the invention, it will be understood that various changes and modifications may be resorted to in keeping with the spirit of the invention as defined by the appended claims.

I claim:

1. An improved farm machine of the class described comprising in combination a motor driven vehicle having a power take-off and a materials handling body for receiving and discharging a load of material, a power transmission unit mounted at the underside of the materials handling body and operatively connected to the said power take-off, a conveyor mechanism including a plurality of sprocket chains and conveyor bars constructed and arranged to move along the bottom of the materials handling body for feeding material rearwardly, a sprocket gear shaft transversely mounted for rotative movement at the rear of the materials handling body in a position to be driven by the power transmission unit, a plurality of sprocket gears fixed to the shaft and having respective sprocket chains of the conveyor mechanism engaged therearound, sprocket chain guide means including a smooth guide roll member rotatably mounted at the front of the materials handling body and having the sprocket chains supported therearound and chain guiding channels formed in the underside of the materials handling body, said guide channels being of a width slightly greater than the combined length of a conveyor bar and respective attached chain portions and cooperating with the said smooth guide roll to provide for the chains and conveyor bars being displaced laterally for a limited distance along the chain guiding roll thereby to prevent breaking of the sprocket chains when the materials handling body is subjected to strain from temporary torque forces developing out of movement of the vehicle over rough ground.

2. A structure according to claim 1 including means for producing intermittent movement of the conveyor mechanism, said means including a crank mechanism driven by the said power transmission unit and a ratchet and pawl device actuated by said crank mechanism.

3. A structure as defined in claim 2 in which the said ratchet and pawl device includes control lever means located at the rear of the materials handling body for stopping and starting the conveyor mechanism independently of movement of the power transmission unit.

4. A structure according to claim 3 including means for varying the speed of the conveyor mechanism.

5. A structure according to claim 4 in which the said crank mechanism includes a shock arrester apparatus for cushioning impact of the crank mechanism during each revolution thereof.

6. A structure according to claim 5 including a beater shaft mounted at the rear of the materials handling body, beater elements fixed in spaced relation around the beater shaft and gear means for driving said beater from the said power transmission unit at a relatively high rotative speed throughout any of the speeds through which the conveyor mechanism may be varied.

7. A structure as defined in claim 6 including means for varying the position of the chain guide roll to change tension in the said chains.

8. An improved farm machine of the class described comprising in combination a motor driven vehicle having a power take-off and a materials handling body for receiving and discharging a load of material, a power transmission unit centrally mounted at the underside of the materials handling body and operatively connected to the said power take-off, said power transmission unit including drive shaft means extending rearwardly and centrally of the materials handling body, transversely disposed shaft means rotatably supported at the rear of the materials handling body and driven by said longitudinal drive shaft, a conveyor mechanism mounted in the materials handling body in spaced relation above the said power transmission unit, said conveyor mechanism including a plurality of sprocket chains and conveyor bars movable along the bottom of the materials handling body for feeding material rearwardly, sprocket gear shaft mounted for rotative movement at the rear of the materials handling body in a position to be driven by the transverse shaft of the power transmission unit, a plurality of sprocket gears fixed to the shaft and having the said sprocket chains of the conveyor mechanism engaged therearound, sprocket chain guide means including a guide roll member rotatably and transversely mounted at the front of the materials handling body and having the forward portions of the sprocket chains supported therearound, guide strips for slidably supporting the bottom edges of the said conveyor bars for travel along horizontal paths extending between the guide roll and the sprocket gears, and a plurality of channel forming sides arranged in abutting relationship to respective guide strips to provide vertical guide surfaces, said channel forming sides being spaced apart a distance slightly greater than the combined length of the conveyor bars and respective attached chains and cooperating with the chain guide roll and guide strips to provide for the chains and chain bars being displaced laterally for a limited distance along the chain guiding roll thereby to prevent breaking of the chains when the materials handling body is subjected to strain from temporary torque forces developing out of movement of the vehicle over rough ground, a beater apparatus mounted at the rear of the materials handling body in a position to discharge material advanced by the said conveyor mechanism rearwardly and gear means driven by the power transmission unit independently of the said conveyor mechanism for revolving the beater apparatus at relatively high rates of speed.

References Cited in the file of this patent

UNITED STATES PATENTS

| | | |
|---|---|---|
| 537,884 | Alexander | Apr. 23, 1895 |
| 1,648,658 | Nirider | Nov. 8, 1927 |
| 1,868,337 | Storm | July 19, 1932 |
| 2,221,401 | Konicek | Nov. 12, 1940 |
| 2,274,481 | Johnston | Feb. 24, 1942 |
| 2,597,052 | Barker | May 20, 1952 |
| 2,621,934 | Atkinson | Dec. 16, 1952 |
| 2,871,021 | Baldridge | Jan. 27, 1959 |
| 2,894,756 | McDonough | July 14, 1959 |

FOREIGN PATENTS

| | | |
|---|---|---|
| 624,320 | Great Britain | June 2, 1949 |
| 690,634 | Great Britain | Apr. 22, 1953 |

OTHER REFERENCES

"John Deere Model (H), Tractor-Drawn Spreader," published before January 1951 by Deere and Company (Moline, Ill.) and numbered A525-48-9. Pages 1 and 13.

"Machines for Power Farming" (Stone et al.), published by John Wiley and Sons (N.Y.) 1957. Pages 292–307.

"Tractor Field Book 1957," published before April 17, 1957 by Farm Implement News Co., Chicago, Illinois. Page 263.